United States Patent Office 3,751,401
Patented Aug. 7, 1973

3,751,401
VULCANIZABLE COMPOSITIONS CONTAINING CYANOISOTHIAZOLYL BIS(DITHIOCARBAMATES
John Joseph D'Amico, Akron, Ohio, assignor to Monsanto Company, St. Louis, Mo.
No Drawing. Continuation-in-part of application Ser. No. 861,137, Sept. 25, 1969. This application Oct. 4, 1971, Ser. No. 186,484
Int. Cl. C08f 27/06
U.S. Cl. 260—79.5 B      13 Claims

ABSTRACT OF THE DISCLOSURE

Cyanoisothiazolyl bis(dithiocarbamates) of the formula

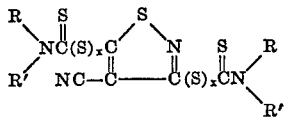

wherein R and R' individually are alkyl, cycloalkyl, or aryl, and R and R' together with the nitrogen atom form a heterocycle, and $x$ is one or two which are useful for accelerating the vulcanization of rubber.

---

This application is a continuation-in-part of application Ser. No. 861,137, filed Sept. 25, 1969, now abandoned.

This invention relates to a new class of compounds, namely 4 - cyanoisothiazol-3,5-diyl-bis(dithiocarbamates) and to methods of using them as accelerators for the vulcanization of rubber.

SUMMARY OF THE INVENTION

I have discovered a class of bis(dithiocarbamates) which are excellent accelerators for the vulcanization of rubber. They are 4-cyanoisothiazol-3,5-diyl bis(dithiocarbamates) of the formula

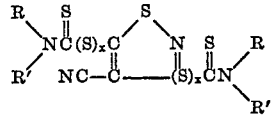

wherein R and R' are alkyl, cycloalkyl, or aryl and may be the same or different, and R and R' together with the nitrogen atom form a heterocycle; $x$ is 1 or 2.

Alkyl radicals are monovalent radicals derived from aliphatic hydrocarbons by the removal of one hydrogen atom. Their general formula is $C_nH_{2n+1}$. The alkyl radical may be primary, secondary, or tertiary, and the primary alkyl may be branched or unbranched. Alkyl radicals of 1–18 carbon atoms are suitable. Lower alkyl radicals of 1–8 carbon atoms are preferred. Alkyl includes aromatic-aliphatic hydrocarbon radicals (aralkyl). Cycloalkyl radicals are cyclic-aliphatic hydrocarbons of the series $C_nH_{2n-1}$. The preferred cycloalkyl radicals contain 5–8 carbon atoms in the ring but cycloalkyl radicals of 3–12 carbon atoms are suitable. Aryl is a univalent organic radical, the free valence of which belongs to an aromatic carbocyclic nucleus and not to a side chain. Examples of such radicals are phenyl and naphthyl. Substituted aryl radicals of the phenyl and naphthyl series are suitable for the practice of this invention. The term aryl as used herein includes substituted aryl radicals. The substituents may be alkyl, alkoxy, nitro, chloro, bromo, fluoro, iodo, phenyl or hydroxy. Aryl radicals of 6–15 carbon atoms are preferred. It is preferred that the aromatic carbocyclic nucleus contain no more than one electro-negative substituent. Heterocyclic radicals of 4–8 carbon atoms in the ring are suitable. The heterocycle may have lower alkyl radicals attached to the ring and the heterocyclic chain may be interrupted by another hetero atom.

Specific examples of R and R' are methyl, ethyl, propyl, isopropyl, butyl, isobutyl, sec. butyl, tert-butyl, amyl, sec.-amyl, tert-amyl, n-hexyl, 2-ethylhexyl, octyl, decyl, dodecyl, cyclopentyl, cyclohexyl, cyclooctyl, cyclododecyl, benzyl, phenethyl, phenyl, naphthyl, chlorophenyl, nitrophenyl, tolyl, xylyl, butylphenyl, nonylphenyl, or xenyl.

Specific examples of heterocyclic radicals which are formed by R and R' together with the nitrogen atom are pyrrolidinyl, 2,5-dimethylpyrrolidinyl, piperidino, 2,6-dimethylpiperidino, 2-ethylpiperidino, morpholino, 2,6-dimethylmorpholino, hexahydro-1H-azepin-1-yl, 3-azabicyclo[3.2.2]non-3-yl, hexahydro - 1(2H)azocin - 1 - yl, and octahydro-1H-azonin-1-yl.

Examples of the new compounds where $x$ is one are 4-cyanoisothiazol-3,5-diyl bis(dimethyldithiocarbamate),
4-cyanoisothiazol-3,5-diyl bis(dibenzyldithiocarbamate),
4-cyanoisothiazol-3,5-diyl bis(ethylmethyldithiocarbamate),
4-cyanoisothiazol-3,5-diyl bis(dipropyldithiocarbamate),
4-cyanoisothiazol-3,5-diyl bis(methylpropyldithiocarbamate),
4-cyanoisothiazol-3,5-diyl bis(diisopropyldithiocarbamate),
4-cyanoisothiazol-3,5-diyl bis(cyclopentylethyldithiocarbamate),
4-cyanoisothiazol-3,5-diyl bis(butylcyclooctyldithiocarbamate),
4-cyanoisothiazol-3,5-diyl bis(dicyclohexyldithiocarbamate),
4-cyanoisothiazol-3,5-diyl bis(N-ethyldithiocarbanilate),
4-cyanoisothiazol-3,5-diyl bis(N-phenyldithiocarbanilate),
4-cyanoisothiazol-3,5-diyl bis(N-p-chlorophenyldithiocarbanilate),
4-cyanoisothiazol-3,5-diyl bis(N-p-tolyldithiocarbanilate),
4-cyanoisothiazol-3,5-diyl bis(N-cyclohexyldithiocarbanilate),
4-cyanoisothiazol-3,5-diyl bis(N-phenyldithiocarbanilate), carbanilate),
4-cyanoisothiazol-3,5-diyl bis[N-methyldithio(p-chlorocarbanilate)],
4-cyanoisothiazol-3,5-diyl bis(pyrrolidinylcarbodithioate),
4-cyanoisothiazol-3,5-diyl bis(morpholinocarbodithioate),
4-cyanoisothiazol-3,5-diyl bis(piperidinocarbodithioate),
4-cyanoisothiazol-3,5-diyl bis(hexahydro-1H-azepin-1-ylcarbodithioate), and
4-cyanoisothiazol-3,5-diyl bis(hexahydro-1(2H)-azocin-1-ylcarbodithioate).

Examples of new compounds where $x$ is 2 are 3,5-di(N,N-dimethylthiocarbamoyldithio)-4-cyanoisothiazole,
3,5-di(N,N-diethylthiocarbamoyldithio)-4-cyanoisothiazole,
3,5-di(N,N-dibenzylthiocarbamoyldithio)-4-cyanoisothiazole,
3,5-di(N,N-dicyclohexylthiocarbamoyldithio)-4-cyanoisothiazole,
3,5-di(N-methylthiocarbaniloyldithio)-4-cyanoisothiazole,
3,5-di(N-phenylthiocarbaniloyldithio)-4-cyanoisothiazole,
3,5-di(N-p-tolylthiocarbaniloyldithio)-4-cyanoisothiazole,
3,5-di(N-cyclohexylthiocarbaniloyldithio)-4-cyanoisothiazole,
3,5-di(morpholinothiocarbonyldithio)-4-cyanoisothiazole,
3,5-di(2,5-dimethylpyrrolidinylthiocarbonyldithio)-4-cyanoisothiazole, 3,5-di(piperidinothiocarbonyldithio)-4-cyanoisothiazole, and 3,5-di(hexahydro-1H-azepin-1-ylthiocarbonyldithio)-4-cyanoisothiazole.

The new 4-cyanoisothiazolyl dithiocarbamates are excellent accelerators for the vulcanization of rubber. Vulcanizates produced using these compounds have excellent physical properties including high modulus and tensile strength. Stocks containing the new accelerators have rapid cure rates, yet have excellent processing safety. The Mooney scorch times of stocks containing the new compounds are comparable to times for stocks containing delayed-action sulfenamide accelerators. The new accelerators are both liquid and solids. The soil accelerators generally are preferred because they are more easily purified and are more convenient to use in conventional rubber blending operations. The liquid accelerators find greater use in fluid blending procedures and in certain latex formulations.

My invention is applicable to rubber formulations containing the usual compounding ingredients such as reinforcing pigments, fillers, vulcanizing agents, retarders, antidegradants and other accelerators. The various grades of carbon blacks, silicas and other particulate reinforcing materials are suitable to use with the new accelerators. Clays, whiting and other inert extenders may be used. Sulfur vulcanizing agent means elemental sulfur which is the most commonly used vulcanizing agent and includes any sulfur containing vulcanizing agent which upon heating releases sulfur in the form available to cross-link rubber, for example, an amine disulfide or a polymeric polysulfide. Any of the conventional retarders may be used. Particularly useful are the new sulfenamide type prevulcanization inhibitors, for example, N-cyclohexylthio phthalimide. Either quinoline or phenylenediamine type antidegradants may be used. The accelerators perform well alone but may be used in mixtures with other accelerators.

The accelerators of my invention may be used in natural and synthetic rubbers or mixtures thereof. The vulcanization of synthetic rubbers that may be accelerated with the compounds of this invention include cis-4-polybutadiene, butyl rubber, ethylene-propylene terpolymers (EPDM rubber), polymers of 1,3-butadiene alone or of isoprene, copolymers of 1,3-butadiene with other monomers for example, styrene, acrylonitrile, isobutylene, and methyl methacrylate. The invention applies to diene rubbers and the terms rubber and diene rubber are synonymous for the purpose of the invention.

The amount of accelerator used depends upon the components in the rubber formulation. Rubber receipes are so varied that it is difficult to predict in advance the amount of accelerator required. A compounder having knowledge of the other ingredients and knowing the process conditions can readily ascertain the amount of accelerator needed. The amount usually is within the range of 0.1 to 5 parts by weight per 100 parts by weight of elastomer, and more often within the range of 0.3 to 2 parts by weight. The preferred usage generally comes within the range of 0.5 to 1.5 parts by weight accelerator.

DESCRIPTION OF PREFERRED EMBODIMENTS

The compounds of this invention where $x$ is one may be made by reacting the alkali metal salt of 3,5-dimercapto-4-isothiazole-carbonitrile with a thiocarbamyl halide at room temperature. The solid products may be recovered by filtration and the liquid products may be recovered by solvent extraction. The intermediate, alkali metal salt of 3,5-dimercapto-4-isothiazolecarbonitrile may be prepared by sulfurization of 2,2-dicyano-1,1-dialkali metal mercapto ethylene. Hatchard, U.S. 3,232,935. The compounds of this invention where $x$ is two may be made by reacting carbon disulfide with a 3,5-di(aminothio)-4-cyanoisothiazole. The intermediate 3,5-di(aminothio)-4-cyanoisothiazole may be prepared by the oxidative condensation of an amine with a salt of 3,5-dimercapto-4-isothiazolecarbonitrile.

A preparation of the dipotassium derivative is as follows: A mixture of 218.4 grams (1.0 mole) of 2,2-dicyano-1,1-dipotassiomercaptoethylene, 2000 ml. of methanol and 33.6 grams (1.05 moles) of sulfur is refluxed with stirring for one hour. The mixture is filtered hot to remove a small amount of solid material. The methanol is removed at the maximum temperature of 40° C. in vacuo. The solid residue is dissolved in 950 ml. of ethanol and 50 ml. of water at reflux temperature. The solution is filtered to remove trace impurities. The solution is cooled to 0° C., and 300 ml. of ethyl ether and 200 ml. of ethyl acetate is added. After one hour between 0°–10° C., the solid product is recovered by filtering, and is air dried at 25°–30° C. 198 grams (79% yield) of 3,5-dipotassiomercapto-4-isothiazolecarbonitrile is obtained. This material is used in the examples shown below.

EXAMPLE 1

4-cyanoisothiazol 3,5-diyl bis(diethyldithiocarbamate) is prepared by the following procedure. To a stirred solution of 25 grams (0.1 mole) of 3,5-dipotassiomercapto-4-isothiazolecarbonitrile (prepared above) in 300 ml. of water, 30.3 grams (0.2 mole) of diethylthiocarbamyl chloride is added in one portion at room temperature. After stirring the mixture for one day at 25°–30° C., 300 ml. of water is added and the solid product is recovered by filtration. The product is washed with water until neutral and air dried at 25°–30° C. 28 grams (69% yield) of product is obtained which after recrystallization from ethyl acetate melts at 134°–135° C. Analyses give 13.07 percent nitrogen and 39.25 percent sulfur compared to 13.84 percent nitrogen and 39.62 percent sulfur calculated for $C_{14}H_{20}N_4S_5$.

EXAMPLE 2

4 - cyanoisothiazol - 3,5 - diyl bis(di-n-butyldithiocarbamate) is prepared by adding 41.7 grams (0.2 mole) of di-n-butylthiocarbamyl chloride to 25 grams (0.1 mole) of 3,5-dipotassiomercapto-4-isothiazolecarbonitrile in 300 ml. of water at room temperature. After stirring the reaction mixture for a day at 25°–30° C., 500 ml. of ethyl ether is added and stirred for 15 minutes. The ether solution is separated, washed with water until neutral and dried over sodium sulfate. The ether is removed in vacuo at maximum temperature of 80°–90° C. and 1–2 mm. Hg pressure. A black liquid, 42 grams (81.5% yield) is recovered. Analyses give 10.07 percent nitrogen and 31.25 percent sulfur compared to 10.84 percent nitrogen and 31.02 percent sulfur calculated for $C_{22}H_{36}N_4S_5$.

EXAMPLE 3

4 - cyanoisothiazol - 3,5 - diyl bis(N-methyldithiocarbanilate) is prepared by adding 37.2 grams (0.2 mole) of N-methylthiocarbaniloyl chloride to a stirred solution of 25 grams (0.1 mole) of 3,5-dipotassiomercapto-4-isothiazolecarbonitrile in 300 ml. of water at room temperature. After stirring the mixture at 25°–30° C. for a day, the precipitate is collected by filtration, washed with water until neutral and air dried 25°–30° C. 43 grams (90.5% yield) of a solid is obtained. The product recrystallized from toluene melts at 229°–231° C. Analyses give 10.98 percent nitrogen and 33.22 percent sulfur compared to 11.85 percent nitrogen and 33.92 percent sulfur calculated for $C_{20}H_{16}N_4S_5$.

The N-methylthiocarbaniloyl chloride used in this example is prepared in quantitative yields by reaction of N-methyl aniline with thiophosgene at room temperature.

EXAMPLE 4

4-cyanoisothiazol - 3,5 - diyl bis(dimethyldithiocarbamate) is prepared by adding, drop-wise, 24.8 grams (0.2 mole) of dimethylthiocarbamyl chloride dissolved in 30 ml. of acetone to a stirred solution of 25 grams (0.1 mole) of 3,5-dipotassiomercapto - 4 - isothiazole-carbonitrile in 200 ml. of acetone and 50 ml. of water at room temperature. After stirring the mixture at 25°–30° C. for 24 hours, 700 ml. of water is added and the mixture stirred for ½ hour. The product is collected by filtration, washed with water until neutral and air-dried at 25°–30° C. 30 grams (86% yield) of a solid is obtained. The product recrystallized from 2/1 ethyl acetate/methyl ethyl ketone melts at 190°–191° C. Analysis gives 34.47 percent carbon, 3.45 percent hydrogen, 16.05 percent nitrogen and 46.03 percent sulfur compared to 34.46 percent carbon, 3.47 percent hydrogen, 16.08 percent nitrogen and 46.00 percent sulfur calculated for

$C_{10}H_{12}N_4S_5$

EXAMPLE 5

4-cyanoisothiazol - 3,5 - diyl bis(morpholinocarbodithioate) is prepared by adding, drop-wise, 33.2 grams (0.2 mole) of morpholinothiocarbonylchloride dissolved in 50 ml. of acetone to a solution of isothiazolecarbonitrile in 300 ml. of acetone and 50 ml. of water at room temperature. The mixture is treated and the product recovered as described in Example 4. 33.5 grams (77% yield) of product is obtained which after recrystallization from 2/1/1 ethyl acetate/methyl ethyl ketone/toluene melts at 186°–187° C. Analysis gives 38.67 percent carbon, 3.62 percent hydrogen, 12.98 percent nitrogen, 7.41 percent oxygen and 37.26 percent sulfur compared to 38.86 percent carbon, 3.73 percent hydrogen, 12.95 percent nitrogen, 7.40 percent oxygen and 37.06 percent sulfur calculated for $C_{14}H_{16}N_4O_2S_5$.

EXAMPLE 6

4-cyanoisothiazol - 3,5 - diyl bis(hexahydro-1H-azepin-1-ylcarbodithioate) is prepared by the procedure of Example 5 except hexahydro-1H-azepin-1-ylthiocarbonylchloride is the intermediate used. The product recrystallized from toluene melts at 184°–185° C. Analyses give 48.33 percent carbon, 5.55 percent hydrogen, 12.00 percent nitrogen and 34.15 percent sulfur compared to 47.33 percent carbon, 5.30 percent hydrogen, 12.27 percent nitrogen and 35.10 percent sulfur calculated for $C_{18}H_{24}N_4S_5$.

EXAMPLE 7

The intermediate 3,5-di(morpholinothio)-4-cyanoisothiazole is prepared by simultaneous but separate dropwise additions of (A) 100 grams (0.40 mole) of 3,5-dipotassium-mercapto-4-isothiazolecarbonitrile in 400 ml. of water and (B) 534.4 grams (0.96 mole) (20% excess) of 13.64 g./100 g. of aqueous sodium hypochlorite to 349.2 grams 4.0 moles) of morpholine in 800 ml. of isopropyl alcohol at 0–5° C. over a period of 1.5 hours. After stirring at 0–5° C. for two hours, 1000 grams of cold water is added. The reaction mixture is stirred at 0–5° C. for two additional hours, the product collected by filtration, washed with water until neutral to litmus and air-dried at 25–30° C. The sulfenamide, M.P. 104–105° C., is obtained in 44% yield. The product recrystallized from isopropyl alcohol and heptane (5/1) melts at 107.0–107.5° C. Analyses give 41.69 percent carbon, 4.62 percent hydrogen, 16.23 percent nitrogen, 9.86 percent oxygen and 27.77 percent sulfur compared to 41.84 percent carbon, 4.68 percent hydrogen, 16.27 percent nitrogen, 9.29 percent oxygen and 27.93 percent sulfur calculated for $C_{12}H_{16}N_4O_2S_3$. Nuclear magnetic resonance spectroscopy confirms the structure for this compound 2.9–3.4 mult. (8H); 3.4–3.9 mult. (8H).

3,5-di(morpholinothiocarbonyldithio) - 4-cyanoisothiazole is prepared by adding in one portion 15.2 grams (0.1 mole) of carbon disulfide to 17.2 grams (0.05 mole) of the above intermediate in 25 ml. of methyl alcohol at room temperature. Upon addition of the carbon disulfide a 10° C. drop in temperature occurs. A thick precipitate forms during the first 2½ hours. The mixture is stirred for three days and 75 ml. of petroleum ether is added and the stirring continued for one hour. The precipitate is recovered by filtration and air-dried at 25°–30° C. The product recrystallized from toluene melts at 132°–133° C. Analyses give 34.15 percent carbon, 3.15 percent hydrogen, 11.07 percent nitrogen, and 44.20 percent sulfur compared to 33.85 percent carbon, 3.25 percent hydrogen, 11.28 percent nitrogen and 45.19 percent sulfur calculated for $C_{14}H_{16}N_4O_2S_7$. Nuclear magnetic resonance spectroscopy confirms the structure for this compound; 3.5–3.9 mult. (8H); 3.95–4.35 mult. (8H).

The accelerating activity of the compounds of this invention is demonstrated by incorporation of accelerating amounts of them into the following rubber recipe.

| | Parts by weight | | |
|---|---|---|---|
| Masterbatch: | | | |
| Smoked sheets | 100 | | |
| Carbon black (HAF) | 50 | | |
| Zinc oxide | 5 | | |
| Stearic acid | 3 | | |
| Hydrocarbon softener | 3 | | |
| Total parts | 161 | | |
| Stock | A | B | C |
| Masterbatch | 161 | 161 | 161 |
| Sulfur | 2 | 2 | 2 |
| Example: | | | |
| 1 | 0.5 | | |
| 2 | | 0.5 | |
| 3 | | | 0.5 |
| Total | 163.5 | 163.5 | 163.5 |

The stocks are cured for the length of time required to obtain optimum cure. The cure temperature is 144° C. Curing characteristics are determined by means of the Monsanto Oscillating Disk Rheometer described by Decker, Wise and Guerry in Rubber World, December 1962, page 68. From the Rheometer data the time to optimum cure is determined, and the stocks are cured in a press for that time. For these specific examples, the times vary from 35 to 45 minutes. The ultimate tensile strength and modulus at 300 percent elongation is determined for each vulcanizate. Mooney scorch times at 135° C. are determined by means of a Mooney Plastometer. The time in minutes ($t_5$) required for the Mooney reading to rise five points above the minimum viscosity is recorded.

The excellent accelerating activity of the new compounds is shown by the data in Table I.

TABLE I

| Stock | A | B | C |
|---|---|---|---|
| Cure time, minutes | 35 | 45 | 40 |
| 300% modulus | 2,170 | 1,880 | 1,630 |
| Ultimate tensile strength | 4,100 | 3,300 | 2,700 |
| Mooney scorch time ($t_5$) | 9.7 | 9.3 | 11.3 |

The accelerating activity of the new compounds in vulcanizable compositions containing different sulful vulcanizing agents is illustrated in Table II.

TABLE II

| Stock | D | E | F |
|---|---|---|---|
| Masterbatch | 161 | 161 | 161 |
| Example I | 0.5 | 0.5 | 0.5 |
| Sulfur | 2.0 | | |
| Sulfasan R (4,4'-dithiomorpholine) | | 3.0 | |
| Vultac 3 (alkyl phenol disulfide) | | | 3.0 |
| Total | 162.5 | 163.5 | 163.5 |
| Mooney scorch time ($t_5$) | 9.7 | 28.9 | 6.6 |
| Cure time, minutes | 40 | 60 | 60 |
| 300% modulus | 1,810 | 2,030 | 850 |
| Ultimate tensile strength | 3,350 | 3,790 | 2,140 |

The accelerating activity of other compounds of the invention and in stocks containing amine antidegradants is shown in Table III.

TABLE III

| Stock | G | H | I |
|---|---|---|---|
| Smoked sheets | 100 | 100 | 100 |
| Carbon black (ISAF) | 45 | 45 | 45 |
| Zinc oxide | 3 | 3 | 3 |
| Stearic acid | 2 | 2 | 2 |
| Hydrocarbon softener | 5 | 5 | 5 |
| Santoflex 13 (p-phenylenediamine anti-degradant) | 2 | 2 | 2 |
| 4-cyanoisothiazol-3,5-diyl bis(dimethyl-dithiocarbamate) | 0.5 | | |
| 4-cyanoisothiazol-3,5-diyl bis(hexahydro-1H-azepin-1-ylcarbodithioate) | | 0.5 | |
| 4-cyanoisothiazol-3,5-diyl bis(morpholino-carbodithioate) | | | 0.5 |
| Total | 157.5 | 157.5 | 157.5 |
| Mooney scorch time ($t_5$) | 24.1 | 27.9 | 21.4 |
| Cure time, minutes | 25 | 35 | 25 |
| 300% modulus | 1,360 | 1,240 | 1,240 |
| Ultimate tensile strength | 3,750 | 3,500 | 3,510 |

Similar evaluations using 3,5-di(morpohlinothiocarbonyldithio)-4-cyanoisothiazole and other compounds of the invention also show good accelerating activity.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising sulfur-vulcanizable diene rubber, sulfur vulcanizing agent and an accelerating amount of an accelerator of the formula

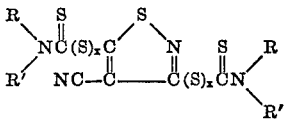

wherein R and R' individually are alkyl of 1–18 carbon atoms, cycloalkyl of 3–12 carbon atoms, aryl of the phenyl or naphthyl series of 6–15 carbon atoms or R and R' together with the nitrogen is a heterocycle of 4–8 carbon atoms and $x$ is one or two.

2. A composition according to claim 1 wherein $x$ is one.
3. A composition according to claim 2 wherein R and R' are lower alkyl.
4. A composition according to claim 3 wherein R and R' are ethyl.
5. A composition according to claim 3 wherein R and R' are methyl.
6. A composition according to claim 3 wherein R and R' are n-butyl.
7. A composition according to claim 2 wherein R and R' are benzyl.
8. A composition according to claim 2 wherein R is methyl and R' is phenyl.
9. A composition according to claim 1 wherein the amount of accelerator is from about 0.2 to about 1.5 parts by weight per 100 parts by weight of rubber.
10. A composition according to claim 1 wherein R and R' together with nitrogen is a heterocycle.
11. A composition according to claim 10 wherein the heterocycle is morpholino and $x$ is one.
12. A composition according to claim 10 wherein the heterocycle is morpholino and $x$ is two.
13. A composition according to claim 10 wherein the heterocycle is hexahydro-1H-azepin-1-yl and $x$ is one.

References Cited
UNITED STATES PATENTS 2,061,520 11/1936 Orthner _____ 260—27
2,766,223 10/1956 Goshorn _____ 260—79.5

JOSEPH L. SCHOFER, Primary Examiner
C. A. HENDERSON, Jr., Assistant Examiner

U.S. Cl. X.R.
260—45.95, 784